United States Patent [19]
Copeland et al.

[11] Patent Number: 5,392,511
[45] Date of Patent: Feb. 28, 1995

[54] MANUFACTURE OF CAMSHAFTS

[75] Inventors: Michael M. Copeland, Nr Drybrook; Roger H. Slee, Warwick, both of England

[73] Assignee: T & N Technology Limited, Rugby, England

[21] Appl. No.: 135,336

[22] Filed: Oct. 13, 1993

[30] Foreign Application Priority Data

Apr. 21, 1993 [GB] United Kingdom ............... 9308253

[51] Int. Cl.6 .............................................. B23P 15/00
[52] U.S. Cl. ................... 29/888.1; 29/888.08; 74/567
[58] Field of Search ............... 29/888.1, 888.08, 458, 29/525.1, 527.2; 74/567

[56] References Cited

U.S. PATENT DOCUMENTS

| Re. 33,888 | 4/1992 | Hartrett | 29/888.1 |
|---|---|---|---|
| 4,438,555 | 3/1984 | Tsumuki et al. | 29/888.1 |
| 4,781,075 | 11/1988 | Yamaji et al. | 29/888.1 |
| 5,205,187 | 4/1993 | Ebbinghaus | 29/888.1 |
| 5,263,249 | 11/1993 | Kaywood | 29/888.1 |

FOREIGN PATENT DOCUMENTS

| 0070103 | 4/1985 | Japan | 29/888.1 |
|---|---|---|---|
| 0070105 | 4/1985 | Japan | 29/888.1 |
| 0070108 | 4/1985 | Japan | 29/888.1 |
| 691657 | 5/1953 | United Kingdom . | |
| 905015 | 9/1962 | United Kingdom . | |
| 2121908A | 1/1984 | United Kingdom . | |

*Primary Examiner*—Irene Cuda
*Attorney, Agent, or Firm*—William R. Hinds

[57] ABSTRACT

A camshaft (10) is formed from a plurality of individual chill cast cams (12) and an elongated shaft (24). Each cam (12) has a hole (20) therethrough which has a groove (22) in its surface at a predetermined angular position. The shaft (24) has a plurality of cam receiving portions (24a) thereon which are spaced along the shaft and each have an outer peripheral surface (26) which is a close fit in the hole (20) in one of the cams (12). The outer peripheral surface (26) has a groove (28) therein at a predetermined angular position. The grooves (22,28) cooperate in forming a passage (30) which receives a wedge member (32) to hold the cam (12) in a fixed orientation relative to the shaft (24).

10 Claims, 1 Drawing Sheet

MANUFACTURE OF CAMSHAFTS

BACKGROUND TO THE INVENTION

This invention is concerned with the manufacture of camshafts, for example camshafts of the type used for operating the valves of an internal combustion engine.

Conventionally, camshafts are cast in one piece, i.e. a plurality of cams and the shaft on which they are mounted, are formed as an integral casting. This method, however, requires complex casting and hardening processes and the cast camshaft has to be finished by protracted grinding operations.

It has previously been proposed that such camshafts should be manufactured by forming the cams and the shaft separately, assembling the cams on the shaft, and securing the cams to the shaft. For example, the cams may be brazed to the shaft or the shaft may be formed as a tube which is caused to expand into gripping contact with the cams by hydraulic expansion. Such methods, however, introduce complex assembling and joining operations to ensure that the cams project from the camshaft in the correct orientations and are securely mounted on the camshaft to prevent relative movement. For example, GB Patent Specification No. 2121908A discloses an assembled camshaft having cams with V-shaped projections which fit into similarly-shaped grooves in a shaft. Cams for this camshaft would, however, be difficult to manufacture and the orientation accuracy is limited by the clearance between the projections and the grooves. Assembled camshafts have hitherto not utilised chill cast cams, i.e. cams whose surfaces are chilled as they solidify to harden them, because existing attachment methods involve heating which damages the hardened surfaces or, in the case of hydraulic expansion, tend to split the cams.

BRIEF SUMMARY OF THE INVENTION

It is an object of the present invention to provide a method of manufacturing a camshaft in which chill cast cams and the shaft can be formed separately and assembled to form the completed camshaft by a simple and reliable process, avoiding the use of heat, or excessive tensile forces during assembly.

The invention provides a method of manufacturing a camshaft of the type which comprises a plurality of similar cams at different positions along the shaft, the cams being arranged in a plurality of orientations relative to a longitudinal axis of the camshaft, the method comprising forming a plurality of individual chill cast cams each of which has a hole therethrough, assembling the cams on a shaft with the shaft received in the holes, and securing the cams to the shaft at predetermined fixed positions thereon and at predetermined fixed orientations, wherein the cams are each formed with a longitudinally-extending groove in the surface of the hole, the groove being at a predetermined orientation relative to a longitudinal axis of the hole, and the shaft is formed with longitudinally-extending grooves in its outer surface at the predetermined positions, there being at least one of the grooves at each of the predetermined positions at a predetermined orientation relative to a longitudinal axis of the shaft, the method also comprising bringing the groove of each cam into alignment with a groove in the shaft and inserting a wedge member into the aligned grooves to hold them in alignment and hold the respective cams against movement from their fixed predetermined positions and orientations on the shaft.

Also in accordance with the invention, there is provided a method of manufacturing a camshaft of the type which comprises a plurality of similar cams at different fixed positions along the shaft, the cams being arranged in a plurality of fixed orientations relative to a longitudinal axis of the camshaft, the method comprising forming a plurality of individual chill cast cams each of which has a hole therethrough, assembling the cams on a shaft with the shaft received in the holes, and securing the cams to the shaft at predetermined fixed positions thereon and at predetermined fixed orientations, wherein the cams are each formed with a longitudinally-extending groove in the surface of the hole, the groove being at a predetermined orientation relative to a longitudinal axis of the hole, and the shaft is integrally formed with a plurality of cam receiving portions each of greater diameter than an immediately adjacent portion of the shaft and respectively located at the predetermined positions such that the cams are secured to the cam receiving portions of the shaft, the shaft being formed with longitudinally extending grooves in the outer surfaces of the cam receiving portions at the predetermined positions, there being at least one of the grooves at each of the predetermined positions at a predetermined orientation relative to a longitudinal axis of the shaft, the method also comprising bringing the groove of each cam into radially overlying alignment with a groove in a cam receiving portion of the shaft, and inserting a tapering wedge member directly into the aligned grooves to hold them in alignment and hold the respective cams against movement from their fixed predetermined positions and orientations on the shaft.

In a method in accordance with the invention, the cams can be simply manufactured by chill casting to ensure a soft core and hard surface followed by drilling and broaching to create the hole and groove. Casting the cams individually and avoiding the need to maintain an accurate angular relationship, allows improved accuracy of the cam profile and consequently a reduction in the finish grinding requirement and hence lower cost. The shaft can also be easily manufactured. The assembly of the cams on to the shaft is simple and inserting the wedge members ensures that the cams remain correctly orientated, and any orientation error is corrected as the wedge member is inserted.

In order to prevent the cams from sliding along the shaft in service, they may be secured by adhesive, e.g. Loctite (Registered Trade Mark).

In order to ensure that the wedge members do not vibrate out of the grooves in service, said wedge members may be secured by adhesive, e.g. Loctite (Registered Trade Mark).

Conveniently, a drive member by which the camshaft can be rotated is also secured to said shaft. Said drive member may have a groove in a hole or recess therein which is aligned with a groove in the shaft, and the method may comprise inserting a wedge member into said aligned grooves to lock the drive member in a fixed orientation relative to the shaft. The drive member and wedge member may also be secured by adhesive.

The grooves in the cams and the shaft may be 1–2.5 mm deep. Said grooves may be of rectangular cross-section. Alternatively, said grooves may be shaped to co-operate in forming a passage of oval cross-section, thereby avoiding corners which might act as stress raisers.

BRIEF DESCRIPTION OF THE DRAWINGS

There now follows a detailed description to be read with reference to the accompanying drawings, of a method of manufacturing a camshaft which is illustrative of the invention.

In the drawings.

DETAILED DESCRIPTION OF PREFERRED EMBODIMENT OF THE INVENTION

Figure 2:
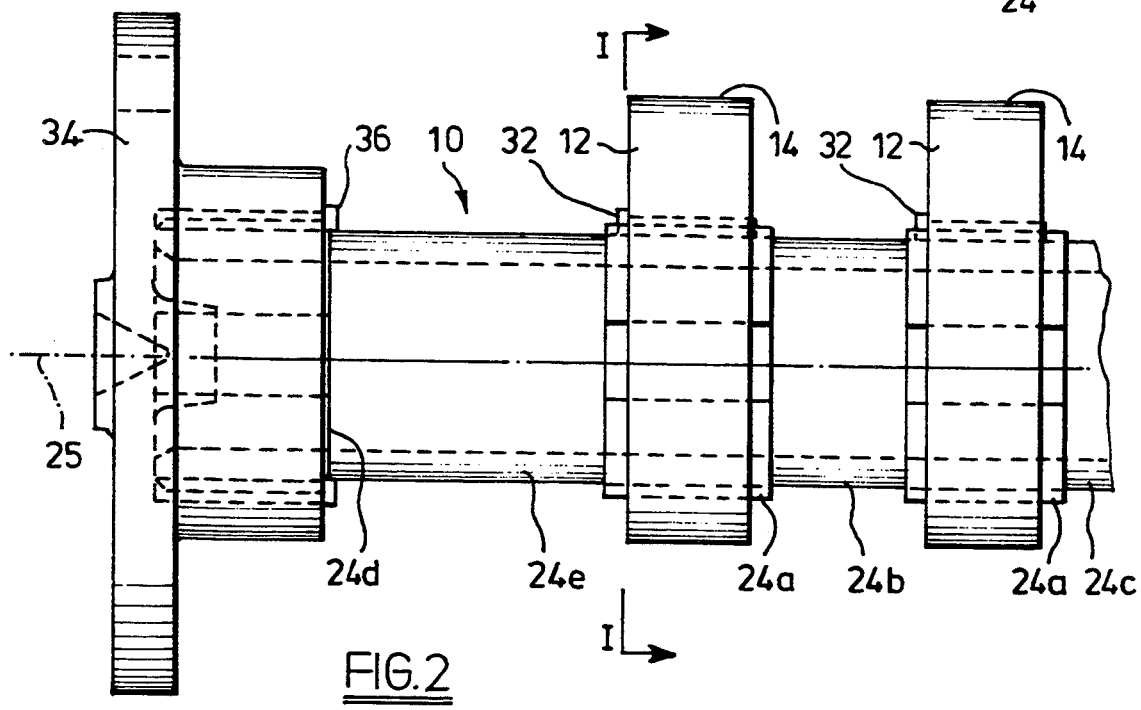
FIG. 2 is an elevational view, on a smaller scale than FIG. 1, of an end portion of a camshaft manufactured by the illustrative method.

The illustrative method is for manufacturing the camshaft 10, a portion of which is shown in FIG. 2. The method comprises forming a plurality of individual cams 12 each of which has a hole 16 therethrough. In this case, there are 8 such cams 12. Each cam has an outer peripheral surface 14 which provides a cam surface of the camshaft 10. The cams 12 are formed by casting and are chilled to harden the surface 14. The holes 16 are formed by drilling and are circular and centred on a longitudinal axis 18 through the cam 12. Each cam 12, is also formed with a longitudinally-extending groove 22 in the surface of the hole 16. The groove 22 is of rectangular cross-section. The groove 22 is formed by broaching along the passage 16. The groove 22 is formed at a pre-determined angular position relative to the axis 18, the groove 22 being arranged, in this case, opposite the crest of the surface 14. It should be noted that the angular position of the groove 22 determines the orientation of the cam 12 on the camshaft 10.

The illustrative method also comprises forming an elongated shaft 24 which, in this case, is tubular. The shaft 24 has a plurality of cam receiving portions 24a thereon, the receiving portions 24a being provided by cylindrical portions spaced along the shaft 24. The receiving portions 24a are arranged in pairs, the portions 24a in each pair being separated by a cylindrical portion 24b of the shaft 24 of smaller diameter. There are four pairs of receiving portions 24a which are separated from one another by portions 24c of the shaft 24 which are cylindrical and of smaller diameter than the portions 24a. At one end of the shaft 24, there is a drive member receiving portion 24d having, the same diameter as the portions 24a. The portion 24d is separated from an end of one of the portions 24a by a cylindrical portion 24e, which is of the same diameter as the portions 24b and 24c.

The shaft 24 is formed by turning down the portions 24e, 24b and 24c from a cylindrical tube.

The cam receiving portions 24a of the shaft 24 are arranged to be a close fit in the holes 16 of the cams 12, i.e. the outer peripheral surfaces 26 of the portions 24a are of slightly smaller diameter than the holes 16. The outer peripheral surfaces 26 are each formed with four longitudinally-extending grooves 28 spaced at 90° intervals about a central longitudinal axis 25 of the shaft 24 (which corresponds in the finished camshaft 10 with the axis 18). The number of grooves 28 corresponds to the number of pairs of cams 12 on the finished camshaft 10.

The grooves 28 are of rectangular cross-section and are the same size as the afore-mentioned groove 22 of the cam 12. The four grooves 22 on each cam receiving portion 24a are formed by four longitudinal machining operations on the shaft 24. Thus, the outer peripheral surface 26 of each cam receiving portion 24a has grooves 28 therein which extend longitudinally of the shaft 24 and each groove 28 is at a pre-determined angular position relative to the longitudinal axis 25.

Figure 1:
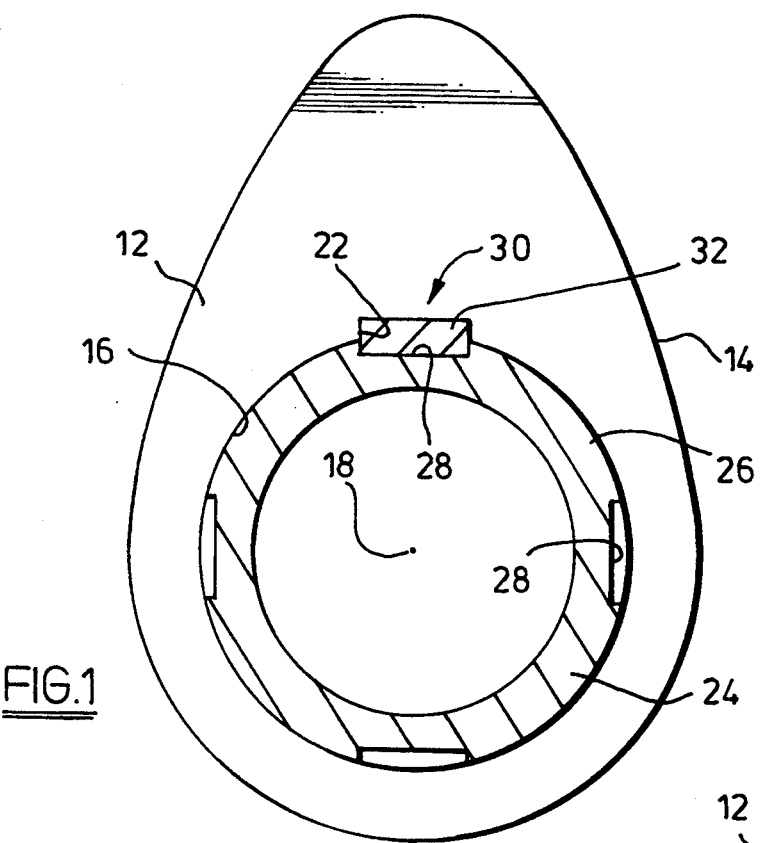
FIG. 1 is an elevational view of a cam member used in the illustrative method.
Figure 4:
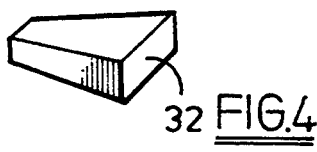
FIG. 4 is a perspective view of a wedge member used in the illustrative method.

In the illustrative method, the cams 12 are assembled on the shaft 24 so that the outer peripheral surface 26 of each cam member receiving portion 24a of the shaft 24 is received in the hole 16 of a cam member 12. To achieve this, the cams 12 are threaded on to the end of the shaft 24 and moved along until they reach their intended cam receiving portion 24a which represents a predetermined position along the shaft 24 for the cam 12. The cams 12 are orientated so that the groove 22 in the cam member 12 and a selected one of the grooves 28 in the shaft 24 are aligned with one another and co-operate in forming a passage 30. The illustrative method continues by inserting a wedge member 32 into the passage 30 of each cam member 12. The wedge member 32 (FIG. 4) is a tapering block of rectangular cross-section and is dimensioned so that, when the wedge member 32 is in the passage 30, it holds the orientation of the cam 12 relative to the shaft 24. The angular positions of the grooves 28 are selected so that the cams 12 can be orientated in four different orientations, as is required for the finished camshaft 10 which is for a four cylinder engine. The act of inserting the wedge member 32 into the passage 30 adjusts any small error in the orientation so that the cams 12 are all fixed in their correct orientations. In order to ensure that the wedge member 32 does not come out of the passage 30 in service, it is secured in the passage by adhesive, and adhesive is also applied between the surface 26 of the receiving portion 24a and the surface 16 of the cam 12 to prevent the cam 12 from moving longitudinally of the shaft 24.

A drive member 34, on to which a sprocket (not shown) can be secured, is secured to the drive member receiving portion 24d by means of a wedge member 36 which is received in similar grooves to the aforementioned grooves 22 and 28 so that the drive member 34 is secured in similar manner to the cams 12.

Figure 3:
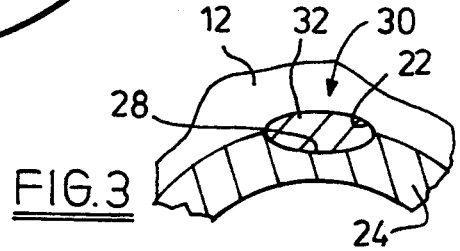
FIG. 3 illustrates an alternative groove shape to that shown in FIG. 1.

FIG. 3 illustrates an alternative cross-sectional shape for the passage 30 which is oval instead of rectangular. The grooves 22 and 28 are each shaped to form part of this oval shape.

We claim:

1. A method of manufacturing a camshaft of the type which comprises a plurality of similar cams at different positions along the shaft, the cams being arranged in a plurality of orientations relative to a longitudinal axis of the camshaft, the method comprising forming a plurality of individual chill cast cams each of which has a hole therethrough, assembling said cams on a shaft with the shaft received in said holes, and securing said cams to said shaft at predetermined fixed positions thereon and at predetermined fixed orientations, wherein said cams are each formed with a longitudinally-extending groove in the surface of said hole, said groove being at a predetermined orientation relative to a longitudinal axis of the hole, and said shaft is formed with longitudinally-extending grooves in its outer surface at said predetermined positions, there being at least one of said grooves at each of said predetermined positions at a predetermined orientation relative to a longitudinal axis of the shaft, the method also comprising bringing the groove of each cam into alignment with a groove in the shaft and inserting a wedge member into the aligned grooves to hold them in alignment and hold the respective cams against movement from their fixed predetermined positions and orientations on the shaft.

2. A method of manufacturing a camshaft according to claim 1, wherein each cam is secured to the shaft by adhesive.

3. A method according to claim 1, wherein said wedge members are secured in the aligned grooves by adhesive.

4. A method according to claim 1, wherein a drive member by which the camshaft can be rotated is also secured to said shaft.

5. A method according to claim 4, wherein said drive member has a groove in a hole or recess therein which is aligned with a groove in the shaft, and the method comprises inserting a wedge member into said aligned grooves.

6. A method according to claim 1, wherein said grooves are 1 mm to 2.5 mm deep.

7. A method according to claims 1, wherein said grooves are of rectangular cross-section.

8. A method according to claim 1, wherein said grooves are shaped to co-operate in forming a passage of oval cross-section.

9. A method as claimed in claim 1 wherein the groove of each cam is brought into radially overlying alignment with a groove in the shaft such that the cam itself substantially radially overlies the aligned grooves and the inserted wedge member.

10. A method of manufacturing a camshaft of the type which comprises a plurality of similar cams at different fixed positions along the cam shaft, the cams being arranged in a plurality of fixed orientations relative to a longitudinal axis of the camshaft, the method comprising forming a plurality of individual chill cast cams each of which has a hole therethrough, assembling said cams on a shaft with the shaft received in said holes, and securing said cams to said shaft at predetermined fixed positions thereon and at predetermined fixed orientations, wherein said cams are each formed with a longitudinally-extending groove in the surface of said hole, said groove being at a predetermined orientation relative to a longitudinal axis of the hole, and said shaft is integrally formed with a plurality of cam receiving portions each of greater diameter than an immediately adjacent portion of the shaft and respectively located at said predetermined positions such that said cams are secured to said cam receiving portions of said shaft, said shaft being formed with longitudinally extending grooves in the outer surfaces of said cam receiving portions at said predetermined positions, there being at least one of said grooves at each of said predetermined positions at a predetermined orientation relative to a longitudinal axis of the shaft, the method also comprising bringing the groove of each cam into radially overlying alignment with a groove in a cam receiving portion of the shaft, and inserting a tapering wedge member directly into the aligned grooves to hold them in alignment and hold the respective cams against movement from their fixed predetermined positions and orientations on the shaft.

* * * * *